(12) United States Patent
Seifert

(10) Patent No.: US 8,528,855 B2
(45) Date of Patent: Sep. 10, 2013

(54) MAGNUS AND TRANSVERSE FLOW HYBRID ROTOR

(75) Inventor: Jost Seifert, Manching (DE)

(73) Assignee: EADS Deutschland GmbH, Ottobrunn (DE)

(*) Notice: Subject to any disclaimer, the term of this patent is extended or adjusted under 35 U.S.C. 154(b) by 76 days.

(21) Appl. No.: 13/332,460

(22) Filed: Dec. 21, 2011

(65) Prior Publication Data

US 2012/0160955 A1    Jun. 28, 2012

(30) Foreign Application Priority Data

Dec. 22, 2010   (DE) .......................... 10 2010 055 676

(51) Int. Cl.
*B64C 39/00* (2006.01)

(52) U.S. Cl.
USPC .................................... 244/21; 244/9; 244/70

(58) Field of Classification Search
USPC ...................... 244/9, 19, 20, 21, 70
See application file for complete search history.

(56) References Cited

U.S. PATENT DOCUMENTS

| | | | | |
|---|---|---|---|---|
| 1,839,005 A * | 12/1931 | Wander, Jr. | ...................... | 244/19 |
| 1,845,616 A * | 2/1932 | McKnight | ........................ | 244/21 |
| 1,991,378 A * | 2/1935 | Johannes | ........................ | 244/19 |
| 2,065,254 A * | 12/1936 | Wander, Jr. | ...................... | 244/19 |
| 2,079,217 A * | 5/1937 | Laskowitz | ........................ | 244/20 |
| 4,390,148 A * | 6/1983 | Cudmore | ........................ | 244/19 |
| 5,100,080 A * | 3/1992 | Servanty | ........................... | 244/9 |
| 5,265,827 A * | 11/1993 | Gerhardt | ........................ | 244/20 |
| 6,007,021 A * | 12/1999 | Tsepenyuk | ........................ | 244/9 |
| 6,527,229 B1 * | 3/2003 | Peebles | ........................ | 244/204.1 |
| 6,845,940 B2 * | 1/2005 | Hashimoto | ........................ | 244/9 |
| 6,932,296 B2 * | 8/2005 | Tierney | ........................... | 244/9 |
| 7,461,811 B2 * | 12/2008 | Milde, Jr. | ........................... | 244/9 |

FOREIGN PATENT DOCUMENTS

DE    10 2007 009 951 B3    7/2008

* cited by examiner

*Primary Examiner* — Tien Dinh
*Assistant Examiner* — Keith L Dixon
(74) *Attorney, Agent, or Firm* — Crowell & Moring LLP

(57) ABSTRACT

A hybrid rotor for an aircraft includes a Magnus rotor rotatable around a Magnus rotor axis and a transverse flow rotor that is kept rotating around an axis of rotation and has a number of axially extending rotor blades that are actuatable to rotate around the axis of rotation and are configured stationary relative to the tangential angle position. The Magnus rotor is located within the transverse flow rotor and has an axis extending in the direction of the axis of rotation. The guide mechanism has a housing segment partially surrounding the transverse flow rotor in the circumferential direction. The housing segment has an adjustment mechanism and is deflectable relative to the Magnus rotor axis. The housing segment is aligned such that the transverse flow rotor generates a propulsion force and causes a transverse flow onto the Magnus rotor to generate lifting force by way of a Magnus effect.

11 Claims, 10 Drawing Sheets a)

b)

c)

MAGNUS AND TRANSVERSE FLOW HYBRID ROTOR

CROSS REFERENCE TO RELATED APPLICATIONS

The present application claims priority under 35 U.S.C. §119 to German 10 2010 055 676.9, filed Dec. 22, 2010, the entire disclosure of which is herein expressly incorporated by reference.

BACKGROUND AND SUMMARY OF THE INVENTION

The present invention relates to a hybrid rotor for an aircraft, an aircraft having a hybrid rotor, the use of a hybrid rotor in an aircraft and a method for flying an aircraft.

A hybrid rotor, also described as a rotor that is a hybrid, represents a combination of two different rotor types or rotor systems. Hybrid rotors are used in aircraft, for example, airplanes, in such a way that the two rotor types or rotor systems perform different tasks. For example, German Patent Document DE 10 2007 009951 B3 discloses an aircraft in which a rotating cylinder delivers the lift, while a cycloid propeller is responsible for controllability and propulsion. The rotating cylinder is also known as Flettner rotor; in it, a rotating cylinder is subjected to an incident flow, as a result of which a force is generated that is aligned transverse to the direction of the incident flow. This force is generated based on the Magnus effect, and is therefore also described as Magnus force. Activation of the propeller elements of the cycloid propeller is technically complex.

Therefore, there is a need to provide a hybrid rotor that is constructed simply and is therefore also light-weight and can be produced cost-effectively.

This is provided by a hybrid rotor, an aircraft, the use of a hybrid rotor in an aircraft and by a method according to exemplary embodiments of the present invention.

According to an exemplary embodiment of the invention, a hybrid rotor is provided for an aircraft having a Magnus rotor, a transverse flow rotor and a guide mechanism. The Magnus rotor can be propelled rotating around a Magnus rotor axis by a first propulsion mechanism and has a closed lateral surface. The transverse flow rotor is kept rotating around an axis of rotation and has a number of axially extending rotor blades, which can be propelled rotating around the axis of rotation by a second propulsion mechanism, and which are designed fixed relative to the tangential angular position. The Magnus rotor is located within the transverse flow rotor and the Magnus rotor axis extends in the direction of the axis of rotation. The guide mechanism has a housing segment partially surrounding the transverse flow rotor in the circumferential direction, whereby the housing segment has an adjustment mechanism and is designed rotatable, at least relative to the Magnus rotor axis. The housing segment can be aligned in such a way that the transverse flow rotor generates a propelling force and brings about a transverse incident flow onto the Magnus rotor in such a way, that a force is generated according to the Magnus effect, which acts as aerodynamic lift.

As a result, it is possible to generate the two required forces for an aircraft, i.e., the propulsion force and the aerodynamic lift force by using a hybrid rotor. Accordingly, the transverse flow rotor, due to its fixed rotor blades that do not change their tangential angular position when the transverse flow rotor rotates and thus always having the same alignment to the rotation center of the rotor in order to move it on a circular track, are designed as simply as possible, i.e. the transverse flow rotor is to be designed simple and contributes to minimizing the weight of the rotor. In combination with the guide mechanism, the cross flow rotor has, in addition to the function of generating the propulsion force, a second function, namely, to bring about a transverse incident flow onto the Magnus rotor in order to make an aerodynamic lift that is as large as possible available as dynamic impulse generator with the rotating Magnus rotor. Due to the adjustability of the housing segment of the guide mechanism, this provides a hybrid rotor, which generates controllable aerodynamic lift forces and propulsion forces and is therefore suitable for an aircraft.

In contrast to aircraft that are capable of taking off vertically according to prior art, for example, so-called oscillating rotor configurations such as, for example, the V-22 Osprey, the aircraft according to the invention provides a simpler mechanical solution and greater flight safety, in particular in the transition phase between cruising flight and takeoff or landing.

According to the invention, the Magnus rotor is a rotation-symmetric hollow piece that causes a deflection of an air flow due to the Magnus effect.

According to this invention, the transverse flow rotor generates a circular flow. This is a rotary air flow that is simultaneously overlaid with a translational air flow which is likewise generated by the transverse flow rotor, or also by a movement of the aircraft in the air during a flight process.

A rotary air flow and a translational air flow form a combination flow that causes a Magnus effect at a geometric body that is exposed to the combination flow. Therefore, the body is also described as Magnus body or Magnus rotor.

In a combination flow, the rotary air flow can also be generated or supported thereby, that the Magnus rotor is activated by rotating. The rotation of the Magnus body or Magnus rotor can lead to a stronger development of the Magnus effect.

The relative motion between the surface of the Magnus rotor and the combination flow having the cited transverse circulating flow or transverse flow and the circular flow are decisive for the Magnus effect.

It should be noted that a stationary Magnus rotor or Magnus body, for example, a stationary cylinder, can already bring about a Magnus effect due to the rotating transverse flow rotor and the combination flow.

For example, the Magnus rotor is designed with a constant circular cross-section (diameter) extending over the axis of rotation; the Magnus rotor thus is a cylinder or cylindrical body in the geometric sense.

For example, the Magnus rotor is designed having a (circular) diameter changing uniformly, for example, a truncated cone, extending over the axis of rotation.

For example, the Magnus rotor is designed having a (circular) diameter that increases and again decreases parabolically, i.e. in the form of a sphere, extending over the axis of rotation.

For example, the Magnus rotor can also consist of different truncated cone segments or cylinder segments.

According to a further aspect of the invention, the Magnus rotor axis extends parallel to the axis of rotation of the transverse flow rotor.

According to a further aspect of the invention, the Magnus rotor is located concentric with respect to the transverse flow rotor.

According to a further aspect of the invention, the Magnus rotor axis extends at an incline to the axis of rotation of the transverse flow rotor, whereby the Magnus rotor axis spans, for example, a plane with the axis of rotation.

According to a further aspect of the invention, the hybrid rotor has a rotor axis, whereby the Magnus rotor axis of the Magnus rotor forms the rotor axis.

According to a further aspect of the invention, the Magnus rotor, for example, a cylinder, and the transverse flow rotor rotate around the rotor axis. The term rotor axis is used in the geometric sense in this context.

According to a further aspect of the invention, the Magnus rotor is propelled by a first shaft and the transverse flow rotor by a second shaft, whereby the first and the second shaft are, for example, located concentrically, for example, inside each other.

According to a further aspect of the invention, the Magnus rotor can be actuated in the direction of rotation of the transverse flow rotor.

According to a further aspect, the Magnus rotor can be actuated counter to the direction of rotation of the transverse flow rotor, for example, to generate a targeted downforce.

According to a further aspect, the transverse flow rotor and the Magnus rotor can also be actuated in opposite directions, for example, for purposes of braking.

According to a further aspect of the invention, the force according to the Magnus effect, also called Magnus force, which is generated at the Magnus rotor, is a lifting force and/or a propelling force.

According to a further aspect of the invention, the transverse flow rotor generates a flow that extends transverse to the Magnus rotor axis.

According to a further aspect of the invention, the transverse flow rotor, together with the guide mechanism, forms a transverse flow blower.

According to a further aspect of the invention, the transverse flow blower serves as thrust generator.

According to an exemplary embodiment of the invention, the housing segment has the shape of a circular arc on the side facing the transverse flow rotor.

According to an exemplary embodiment of the invention, the housing segment has the same cross-section shape extending over the entire length of the Magnus rotor.

According to an alternative aspect of the invention, the housing segment has different cross-section shapes extending over the length of the Magnus rotor. As a result it is possible, for example, to provide additional aerodynamic properties of the transverse flow rotor, depending on the respective position relative to an aircraft.

According to a further aspect of the invention, in cross-section (i.e., seen horizontal to the Magnus rotor axis), the housing segment has the shape of a circular arc segment.

According to a further aspect of the invention, the housing segment has adjustable profile elements on the side facing away from the transverse flow rotor, by means of which the cross-section shape on the side facing away can be changed to improve the aerodynamic properties. For example, the changes take place depending on the rotation setting.

According to a further aspect of the invention, between the lateral surface of the Magnus rotor and the rotating rotor blades, a distance is provided in radial direction that depends on the diameter of the Magnus rotor.

For example, the diameter of the Magnus rotor is just as large up to twice the size as the distance of the lateral surface to the rotor blades.

According to a further example, the relationship of the diameter of the Magnus rotor and the distance to the rotor blades is 2:1.

According to an aspect of the invention, the profile depth and the angle of approach of the rotor blades can be chosen as desired, whereby these two parameters are related to each other with respect to the effect. Furthermore, the diameter of the transverse flow rotor can be specified. The number of rotor blades in turn is related to the diameter of the transverse flow rotor and the profile depth. If these dimensions are specified, the inner diameter of the transverse flow rotor is also known, i.e., the distance of the rotor blades from the center. The diameter of the Magnus rotor, for example, a cylinder, is then given by the relationship cited above, of the distance between the rotor blades and the lateral surface of the Magnus rotor to the diameter of the Magnus rotor.

According to an exemplary embodiment of the invention, in cross-sections, the rotor blades respectively have a curved shape with a concave and a convex side, whereby the convex side faces the Magnus rotor.

According to a further aspect of the invention, at least two, preferably sixteen rotor blades are provided.

According to an exemplary embodiment of the invention, in cross-section, the rotor blades respectively have an angle of 15° to 70° to the radial direction.

According to a further aspect of the invention, in cross-section, the rotor blades respectively have an angle of 30° to the radial direction.

The term radial direction relates to a connection line between the Magnus rotor axis and the center of the cross-section of the rotor blade, and the direction in cross-section relates to the tangential direction for a curved cross-section shape.

As has been cited already, the rotor blades do not change their angle during the rotation of the transverse flow rotor.

According to a further aspect of the invention, the rotor blades extend parallel to the axis of rotation in axial direction, i.e., they have a constant distance to the axis of rotation.

According to a further aspect of the invention, the rotor blades extend inclined to the axis of rotation in the axial direction, whereby the rotor blades have an increasing or decreasing distance with respect to the axis of rotation, i.e., the rotor blades respectively extend in a plane with the axis of rotation and are inclined to the axis of rotation.

According to an exemplary embodiment of the invention, the Magnus rotor is a cylinder, and in the area of its ends it respectively has an end plate that projects over the cylinder surface. The term cylinder surface relates to the lateral surface or circumferential surface of the cylinder.

According to a further aspect of the invention, the plates are formed at the facing ends of the cylinder.

According to a further aspect of the invention, the end plates rotate with the cylinder; for example, the plates are attached directly to the cylinder.

According to an exemplary embodiment of the invention, the cylinder has a number of plates that are located between the end plates, whereby the plates have a larger diameter than the lateral surface.

According to a further aspect, the plates are provided in a Magnus rotor that has a different rotation-symmetric shape.

According to the invention, an aircraft is also provided that has a fuselage area and at least one hybrid rotor according to one of the exemplary embodiments and aspects described above. The Magnus rotor and the transverse flow rotor of the at least one hybrid rotor are retained at the fuselage area. Furthermore, a first propulsion device for rotating the Magnus rotor of the at least one hybrid rotor and a second propulsion device for rotating the transverse flow rotor of the at least one hybrid rotor are provided. The Magnus rotor axis is located horizontal to the flight direction, for example, at an angle between 30° and 150°, preferably 45° to 135°, further preferred 80° to 100°, for example, 90°.

This makes it possible to provide an aircraft in which the hybrid rotor takes on the function of propulsion and the function of lift. In other words, compared with a conventional aircraft having an airfoil and, for example, a propulsion mechanism, the hybrid rotor takes on the function of the propeller for propulsion and the function of the airfoils for the lift.

According to a further aspect, additional airfoils are present.

According to a further aspect of the invention, for controlling the aircraft, an elevator unit and a fin are provided, for example, in the posterior section of the fuselage area.

According to a further exemplary embodiment of the invention, the aircraft has a longitudinal axis, and on both sides of the longitudinal axis, at least one hybrid rotor is provided respectively according to one of the preceding exemplary embodiments and aspects.

According to a further aspect of the invention, at least two hybrid rotors are provided that are located on diametrically opposed sides of the longitudinal axis, whereby the at least two hybrid rotors are at a distance to each other and form a propulsion pair or a propulsion group.

According to a further aspect of the invention, different rpms per hybrid rotor are provided for controlling the aircraft, i.e., as a result of the different actuation of the hybrid rotors, different lift and propulsion forces can be generated on the two sides of the longitudinal axis.

According to a further exemplary embodiment of the invention, at least two hybrid rotors located at a distance in the longitudinal direction are provided according to one of the preceding exemplary embodiments and aspects.

According to a further aspect of the invention, in the longitudinal direction, at least two propulsion pairs or two propulsion groups are provided.

The invention also includes the use of a hybrid rotor according to one of the previously described exemplary embodiments and aspects in an aircraft.

According to a further aspect of the invention, the use of an aircraft having a hybrid rotor according to one of the previously cited exemplary embodiments and aspects is provided.

According to a further exemplary embodiment of the invention, a method for flying an aircraft is provided that includes the following steps.

a) Rotating a Magnus rotor around a Magnus rotor axis, whereby the Magnus rotor has a closed lateral surface for generating a force according to the Magnus effect;

b) rotating a transverse flow rotor around an axis of rotation that has a number of axially extending rotor blades, which are designed stationary relative to the tangential angle position, whereby the rotation of the transverse flow rotor generates a propelling force for the aircraft, which runs transverse to the Magnus rotor axis; whereby the Magnus rotor is located within the transverse flow rotor and the axis of rotation extends in the direction of the Magnus rotor axis; and c) aligning a housing segment of a guide mechanism that partially surrounds the transverse flow rotor in the circumferential direction by deviating the housing segment relative to the Magnus rotor axis in such a way that due to the transverse flow rotor, a transverse flow is created at the Magnus rotor by means of which the force according to the Magnus effect is generated.

According to a further aspect of the invention, rotating the Magnus rotor generates a lifting force.

According to a further aspect of the invention, rotating the Magnus rotor also generates a propelling force, which supports the propelling force generated by the transverse flow rotor.

According to a further aspect of the invention, the two rotor types generate a force that has a lift vector and a propulsion vector.

According to a further aspect of the invention, the transverse flow of the Magnus rotor is provided in such a way that a force according to the Magnus effect is generated that acts upon the aircraft.

According to a further aspect of the invention, the force according to the Magnus effect is a propelling force and a lifting force, as has already been mentioned above.

According to a further exemplary embodiment of the invention, the rotation of the Magnus rotor and the rotation of the transverse flow rotor and the deflection of the guide mechanism can be regulated separately in such a way that different lifting forces and propelling forces can be adjusted.

The concept of control thereby includes, for example, the following aspects:

1. The rpm of the transverse flow rotor influences the speed of the air flow and thus the thrust.

2. The rpm of the Magnus rotor influences the deflection of the air flowing against it and thus on account of the Magnus effect, the lifting force as well.

3. The rotatable deflector plate influences the direction of the air flowing around and through the hybrid rotor and thus the direction of the total force (consisting of propulsion and lift).

The cited possibilities of regulation thus make rpm changes possible that influence the magnitude of the forces. The adjustment of the deflector plate influences the direction of the forces.

According to a further aspect of the invention, different directions of flight can be selected.

According to a further aspect of the invention, the guide mechanism is adjusted in such a way that a vertical lift and propulsion force is generated that makes a vertical takeoff of the aircraft possible, or a short start, i.e., a takeoff with an extremely short runway.

Let it be pointed out that the characteristics of the exemplary embodiments and the aspects of the devices also apply to embodiments of the method as well as the use of the device and vice versa. Moreover, even those characteristics can be freely combined with each other, for which this is not explicitly mentioned.

Other objects, advantages and novel features of the present invention will become apparent from the following detailed description of one or more preferred embodiments when considered in conjunction with the accompanying drawings.

BRIEF DESCRIPTION OF THE DRAWINGS

In the following, with the aid of the attached drawings, an exemplary embodiment of the invention will be addressed in further detail.

Shown are.

DETAILED DESCRIPTION OF THE DRAWINGS

Figure 1:
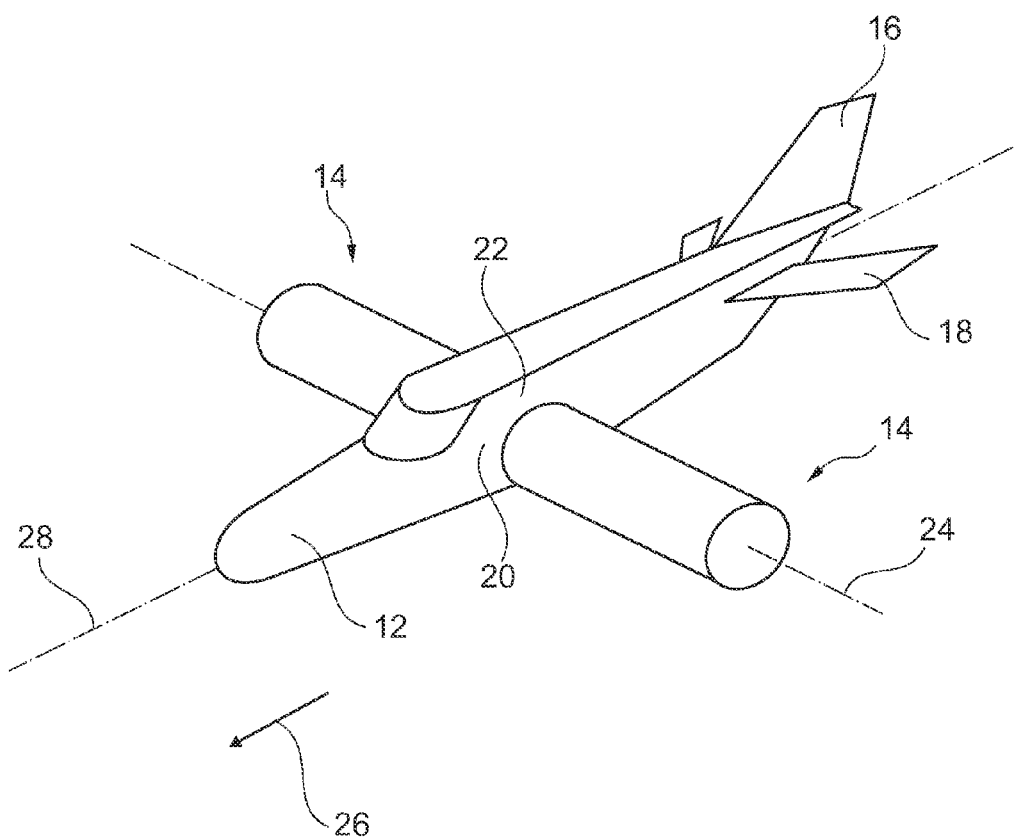
FIG. 1 shows an aircraft having a hybrid rotor according to an exemplary embodiment of the invention.

FIG. 1 shows an aircraft 10 in an angular view. Aircraft 10 has a fuselage area 12 and at least one hybrid rotor 14. For example, two hybrid rotors are provided of which respectively one is located on one side of the fuselage area.

Aircraft 10 further has a fin 16 and an elevator unit 18 in the posterior section of the fuselage area.

Aircraft 10 shown in FIG. 1 is, for example, designed as an aircraft, whereby in addition to smaller passenger planes, wide-bodied airplanes for passengers, as well as also transport aircraft and other types of aircraft are provided.

According to a further aspect of the invention which is, however, not illustrated in further detail, the aircraft can also be a different vehicle type, for example, an airship.

With reference to FIG. 1, hybrid rotor 14 has a Magnus rotor, a transverse flow rotor and a guide mechanism, which are, however, not labeled with reference numbers here, but will be explained in more detail in the following figures.

The Magnus rotor and the transverse flow rotor of the at least one hybrid rotor are retained at the fuselage area. Aircraft 10 further has a first propulsion mechanism 20 for rotating the Magnus rotor of the at least one hybrid rotor, and a second propulsion device 22 for rotating the transverse flow rotor of the at least one hybrid rotor. The Magnus rotor axis that is shown in FIG. 1 labeled with reference number 24 is located horizontal to the flight direction, which is indicated with an arrow 26 in FIG. 1.

According to a further aspect of the invention, which is likewise shown in FIG. 1, aircraft 10 has a longitudinal axis 28 and on both sides of longitudinal axis 28, at least one hybrid rotor 14 is provided respectively.

Before any additional exemplary embodiments shown in FIGS. 6, 7 and 8 will be addressed relative to the configuration and number of hybrid rotors, hybrid rotor 14 will be explained in further detail with the aid of FIG. 2 and those following.

Figure 2:
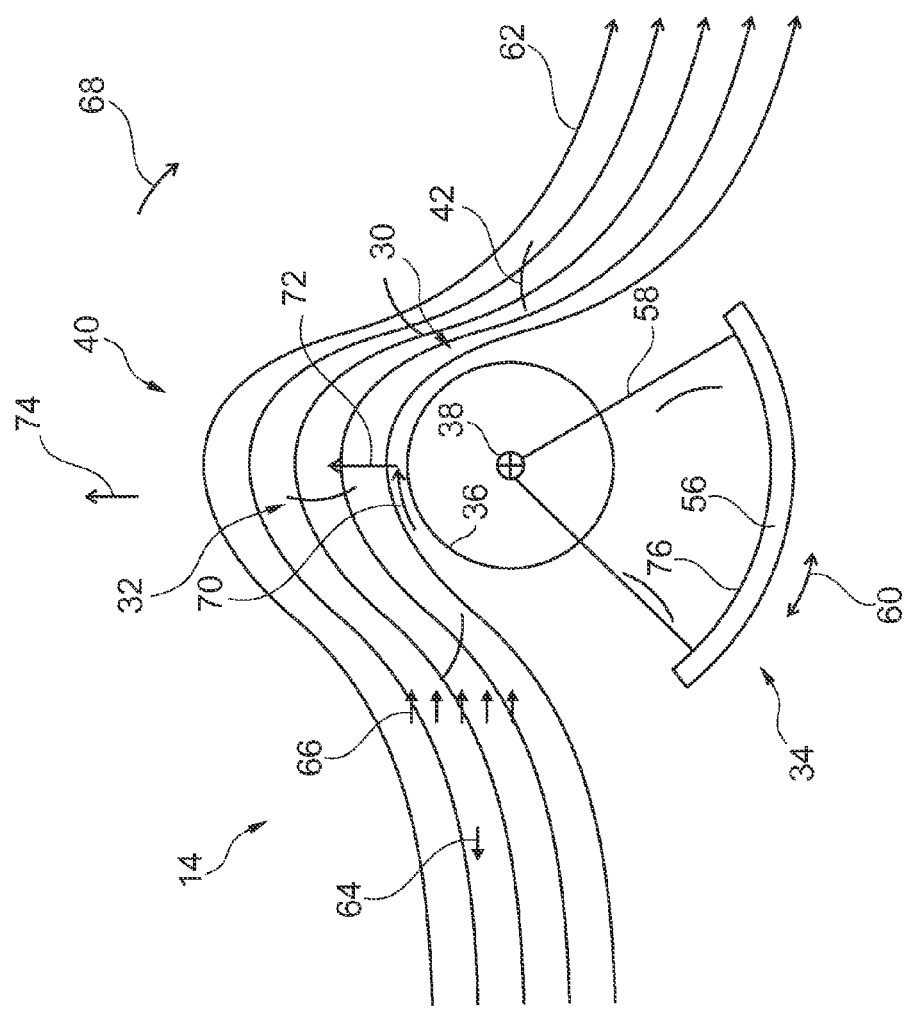
FIG. 2 shows a hybrid rotor according to the invention in a schematic cross-section.

In FIG. 2, hybrid rotor 14 is shown in a schematic lateral view. Hybrid rotor 14 for an aircraft has a Magnus rotor 30, a transverse flow rotor 32 and a guide mechanism 34.

Magnus rotor 30 can be actuated by a propulsion mechanism to rotate around its Magnus rotor axis, and has a closed lateral surface 36. The Magnus rotor axis is identified by reference number 38.

It should be noted that hybrid rotor 14 includes Magnus rotor 30, transverse flow rotor 32 and the guide mechanism 34. The first and the second propulsion mechanisms 20, 22 are mentioned in this connection, but in the embodiment described, they are not a direct component of hybrid rotor 14 according to the invention.

According to a further aspect, hybrid rotor 14 includes, in addition to Magnus rotor 30 and transverse flow rotor 32 and guide mechanism 34, first propulsion mechanism 20 and second propulsion mechanism 22. For example, Magnus rotor 30 can be actuated by first propulsion mechanism 20 that is mentioned in FIG. 1, but not shown there in further detail.

Transverse flow rotor 32 is kept rotating around an axis of rotation and has a number 40 of axially extending rotor blades 42, which can be actuated to rotate around the axis of rotation by a propulsion mechanism. For example, rotor blades 42 can be actuated by the second propulsion mechanism 22, which was mentioned in connection with FIG. 1.

Magnus rotor 30 is located within transverse flow rotor 32 and Magnus rotor axis 38 extends in the direction of the axis of rotation. For example, Magnus rotor axis 38 extends parallel to the axis of rotation. According to one aspect of the invention, Magnus rotor 30 is located concentric with transverse flow rotor 32.

According to an exemplary embodiment that is not shown, Magnus rotor 30 is located within transverse flow rotor 32, whereby the respective rotor axes are offset with respect to each other. Thereby, the rotor axes can have an angle with respect to each other and can lie, for example, in one plane.

Figure 3:
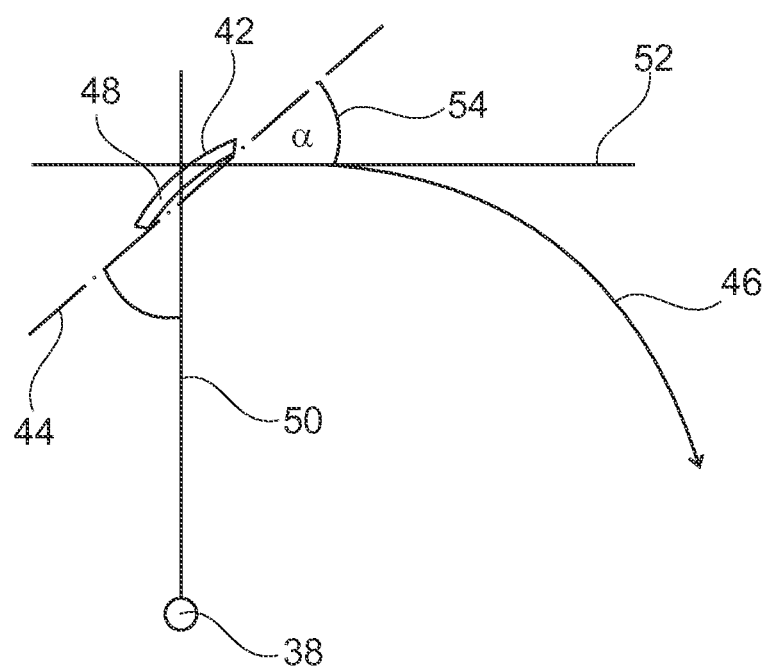
FIG. 3 shows a cross-section of a hybrid rotor from FIG. 2.

Rotor blades 42 are designed stationary relative to the tangential angle position. The tangential angle position is understood to be the angle that is occupied by the rotor blades with respect to the tangential. As shown in FIG. 3, rotor blade 42 has a connection line 44 between the two outer points of rotor blade 42 that has, for example a curved design. During the rotation of the transverse flow motor, rotor blade 42 performs a motion along a circular path 46 around the Magnus rotor axis as central point or axis of rotation. The axis of rotation or the Magnus rotor axis 38 can be connected with a virtual central point 48 of rotor blade 42, which is shown by a radially extending connection line 50. Perpendicular to this connection line 50, a tangential line 52 is shown. With its alignment that is indicated by line 44, rotor blade 42 has an angle position 54, which is additionally identified in FIG. 3 by the symbol α.

It should be noted that the directional straight line 44 does not extend through the virtual center of the rotor blade, so that the directional straight line 44 also does not cross the tangential line 52 in center 48 of the rotor blade, however, a line extending parallel to directional straight line 44 would have the same angle 54 to tangential line 52.

According to the illustrated exemplary embodiment, rotor blades 42 extend parallel to the axis of rotation in axial direction, i.e., they have a constant distance to the axis of rotation.

According to a further aspect of the invention that is not shown in further detail, rotor blades 42 extend at an incline to the axis of rotation in axial direction, whereby the rotor blades have an increasing or decreasing distance to the axis of rotation, i.e., the rotor blades respectively extend in a plane with the axis of rotation, but are inclined to the axis of rotation.

Guide mechanism 34 shown in FIG. 2 has a housing segment 56, which partially surrounds the transverse flow rotor in the circumferential direction. Housing segment 56 has an adjustment mechanism 58, with which housing segment 56 is designed rotatable at least relative to Magnus rotor axis 38, which is indicated with a double-arrow symbol 60.

According to a further aspect or the invention, the adjustment mechanism has one or more actuators or a different propulsion mechanism to perform the rotation or ensure the adjustment in the respectively attained position, which is, however, not shown in further detail.

As indicated in FIG. 2 by symbolic flow arrows 62, housing segment 56 can be aligned in such a way that transverse flow rotor 32 causes a propulsion force 64, which is shown symbolically with an arrow, and simultaneously a transverse flow onto the Magnus rotor, which is indicated with arrow symbols 66.

As indicated in FIG. 2 by a rotation arrow 68, the rotation of the transverse flow rotor takes place clockwise, which is otherwise also already given by the setting of the rotor blades.

Further, a Magnus rotor rotation arrow 70 indicates that the Magnus rotor in the shown exemplary embodiment likewise rotates clockwise.

Due to the transverse flow 66 and rotation 70 of the Magnus rotor, a force 72 is generated according to the Magnus effect. Force 72 brings about a lifting force 74 of the hybrid rotor in addition to the propelling force 64.

As is not shown in further detail, the Magnus rotor is driven by a first shaft and the transverse flow rotor by a second shaft which is, for example, located concentrically, for example, extending into each other.

Transverse flow rotor 32 forms, together with guide mechanism 34, a transverse flow blower that generates a flow, which extends transverse to the Magnus rotor axis 38.

As can also be seen in FIG. 2, the housing segment has a side 76 that is facing the transverse flow rotor. This side 76 that faces the transverse flow rotor has the shape of a circular arc, which is linked to the revolving rotor blades 42.

According to an embodiment, housing segment 56 is designed with the same cross-section for the entire length of the Magnus rotor. Alternatively, it the housing segment can have different cross-section shapes extending over the length of the Magnus rotor, which is, however, not shown in further detail.

Figure 4:
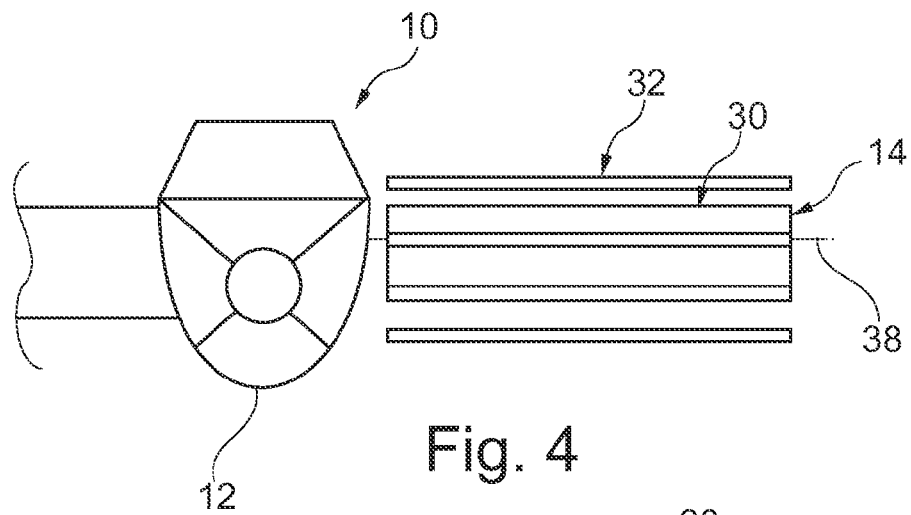
FIG. 4 shows a further embodiment of a aircraft having a hybrid rotor according to the invention.

In FIG. 4, a further exemplary embodiment is shown in which aircraft 10 is shown in a schematic and extremely simplified front view. As can be seen, hybrid rotor 14 that is located on the right in the drawing, i.e., the backboard hybrid rotor relative to the flight direction, has Magnus rotor 30 and transverse flow rotor 32. Furthermore, guide mechanism 34 is present which is, however, not shown in further detail.

Figure 5:
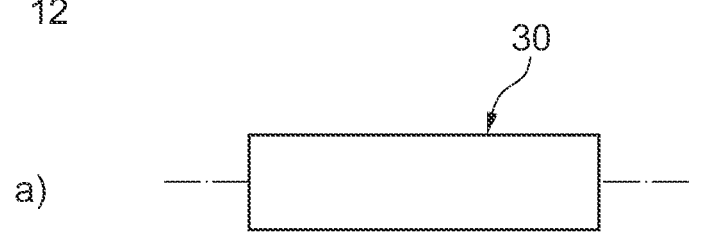
FIG. 5 shows a further embodiments of the hybrid rotor according to the invention.
Figure 5:
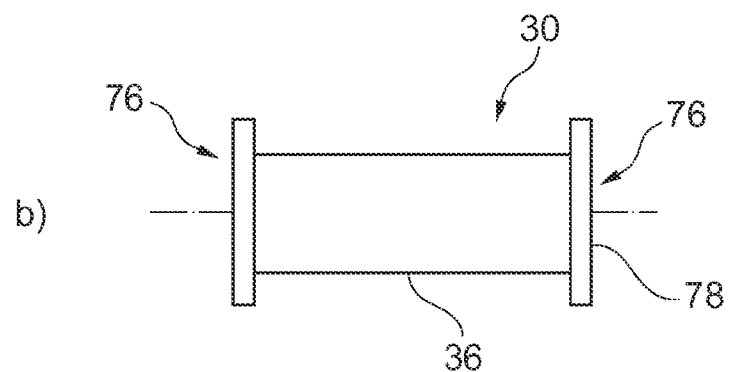
Figure 5:
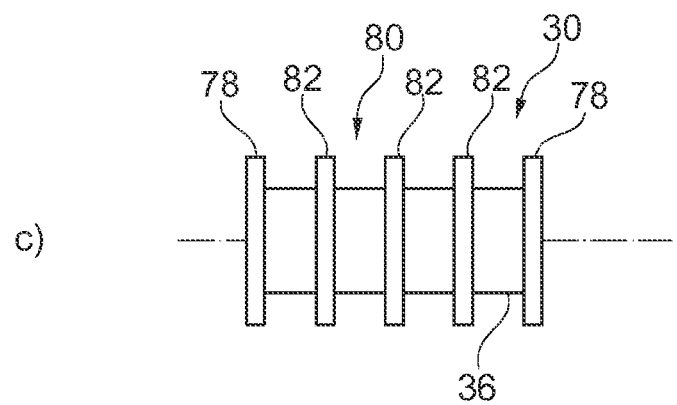

In FIG. 5a, hybrid rotor 14 is shown with Magnus rotor 30 which is designed, for example, as a cylinder.

According to a further aspect of the invention which is, however, not shown in further detail, the Magnus rotor is formed as a truncated cone or consists of different truncated cone and/or cylinder segments. For example, the Magnus rotor can also have other rotation-symmetric shapes or segments of other rotation-symmetric shapes, for example, spherical shapes such as a sphere.

According to a further exemplary embodiment, which is shown in FIG. 5b, Magnus rotor 30 is a cylinder and has, in the section of its ends 76, respectively one end plate 78 projecting over the cylinder surface. For example, end plates 78 are formed at the facing ends of the cylinder and rotate with the cylinder.

According to a further exemplary embodiment, which is shown in FIG. 5c, the cylinder of Magnus rotor 30 has a number 80 of plates 82, which are located between the two end plates, whereby plates 82 have a larger diameter than lateral surface 36.

As shown in FIG. 5c, end plates 78 and plates 82 have the same diameter. According to a further exemplary embodiment that is, however, not shown, plates 82 have a different diameter than plates 78 at the end, for example, a smaller diameter. Beyond that, it is also provided that in an additional exemplary embodiment that is likewise not shown, plates 82 have different diameters, for example, they become smaller toward the fuselage area.

Figure 6:
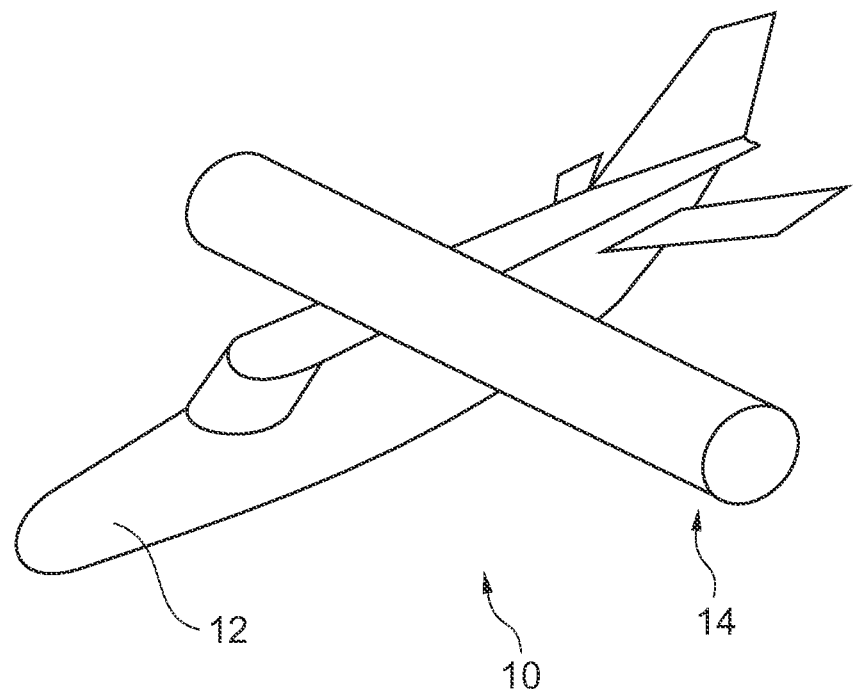
FIG. 6 shows a further embodiment of an aircraft with a hybrid rotor according to the invention.
Figure 7:
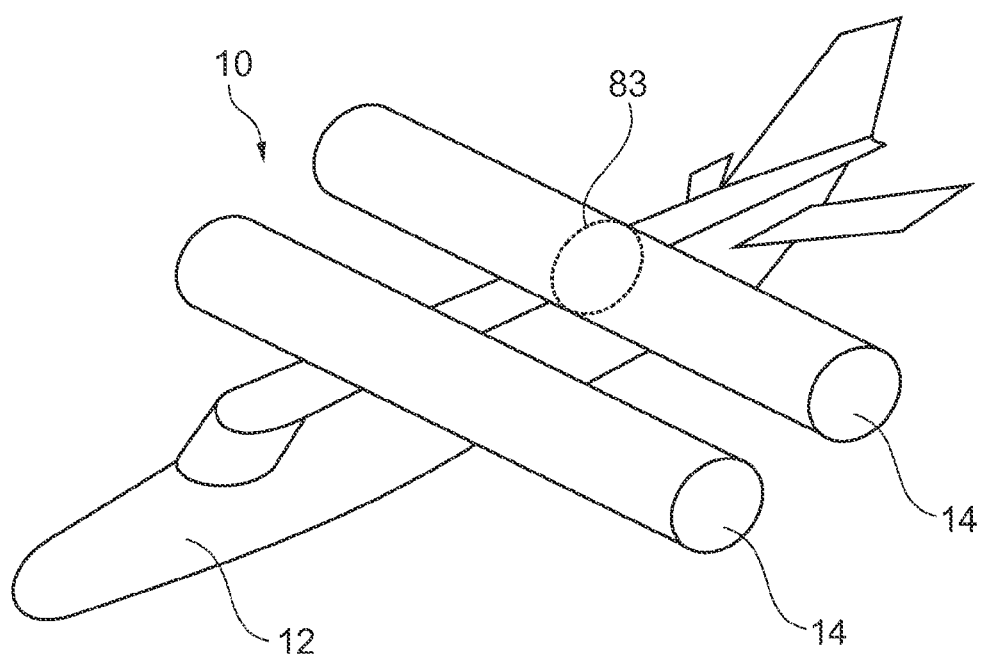
FIG. 7 shows a further embodiment of an aircraft with a hybrid rotor according to the invention.

A further aspect is shown in FIG. 6. According to an exemplary embodiment, aircraft 10 is designed with a hybrid rotor 14 that is, for example, provided above fuselage 12 and projects away from the fuselage area on both sides.

According to a further exemplary embodiment, aircraft 10 is designed with two hybrid rotors 14 that are at a distance to each other in the longitudinal direction. As shown in FIG. 7 schematically, two hybrid rotors 14 are located that respectively project significantly over the lateral sections of fuselage 12.

The illustrated hybrid rotors 14 can, according to a further exemplary embodiment, also be designed as two hybrid rotors 14 located directly adjacent to each other, which is indicated in FIG. 14 by way of example by a joint 83 for posterior hybrid rotor 14.

According to a further exemplary embodiment that has already been presented in FIG. 1, at least two hybrid rotors 14 are provided perpendicular to longitudinal axis 28, which are located on diametrically opposed sides of longitudinal axis 28, whereby the at least two hybrid rotors are at a distance to each other, for example, due to the fuselage area 12 that lies between, and form a propulsion pair or a propulsion group 84.

Figure 8:
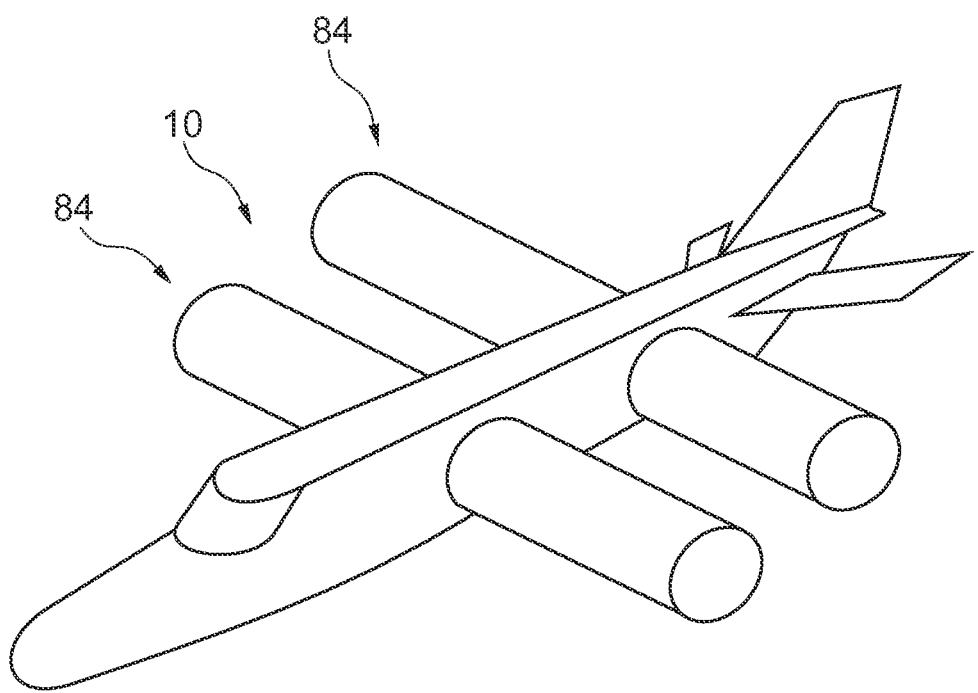
FIG. 8 shows a further embodiment of an aircraft with a hybrid rotor according to the invention.

In FIG. 8, an exemplary embodiment is shown in which aircraft 10 has two propulsion pairs or propulsion groups 83 in the longitudinal direction.

Figure 9:
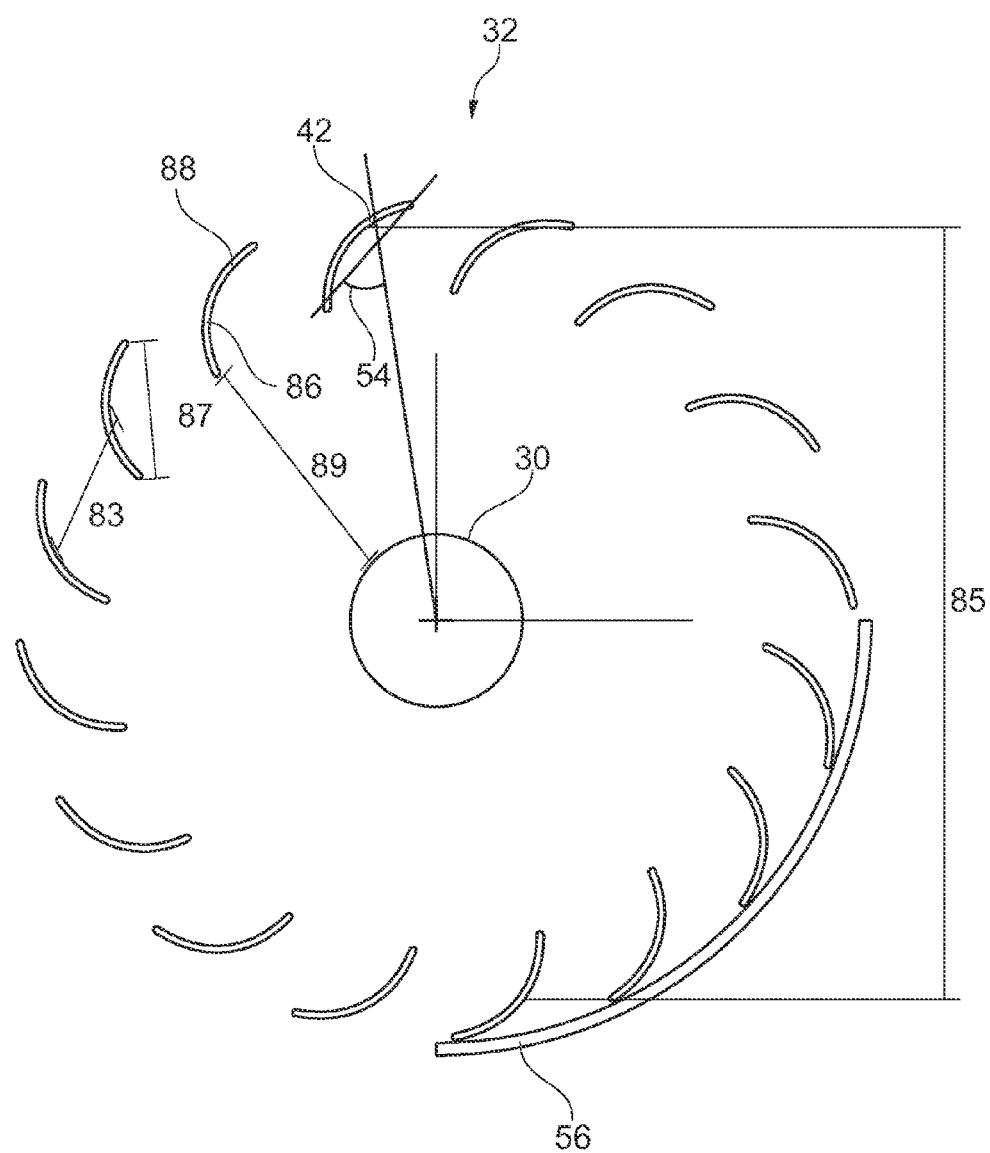
FIG. 9 shows a further embodiment of a hybrid rotor according to the invention in a lateral view.

In FIG. 9, a further exemplary embodiment of transverse flow rotor 32 is shown. In the illustrated exemplary embodiment, transverse flow rotor 32 has a number of 16 rotor blades 42.

According to a further exemplary embodiment, at least two rotor blades 42 are provided, which is, however, not shown in further detail.

The rotor blades respectively have a curved shape in cross-section with a concave side 86 and a convex side 88. As can be seen, concave side 86 faces Magnus rotor 30.

According to a further aspect of the invention, the cross-section shape of the rotor blades changes over their length, i.e., over the width of the aircraft.

Magnus rotor 30 is only symbolically indicated in FIG. 9 and can, in particular its dimensions in relation to the transverse flow motor, also be designed differently.

As has already been explained in connection with FIG. 3, the rotor blades have an angle 54 to the radial direction in cross-section. For example, the value of this angle 54 lies in a range of approximately 15° to 70°.

As shown in FIG. 9, the rotor blades respectively have an angle of 30° to the radial direction, according to an exemplary embodiment.

According to one aspect of the invention (not shown in further detail), between the lateral surface of the Magnus rotor and the rotating rotor blades, a distance is provided in radial direction that depends on the diameter of the Magnus rotor.

For example, the diameter of the Magnus rotor is just as large to twice as large as the distance of the lateral surface to the rotor blades.

According to a further example, the relationship of the diameter of the Magnus rotor and the distance to the rotor blades is 2:1.

According to a further aspect of the invention, a distance 89 in radial direction is provided between the rotating rotor blades 42 and lateral surface 36, which amounts to one to two times the size of a profile depth 87 of a rotor blade 42.

As mentioned already, the distance according to a further example, different than that in FIG. 9, is one time to one half the size of the diameter of the Magnus rotor.

According to a further aspect of the invention, rotor blades 42 have a diameter 85 that is five times to eight times the size of the profile depth 87 of a rotor blade 42.

According to a further aspect of the invention, a circumferential distance 83 of rotor blades 42 is provided that is at least as large as the profile depth 87 of rotor blades 42.

The profile depth, the circumferential distance, as well as the number of the rotor blades can, for example, be chosen freely in principle. From them are given, for example, when using the preferred relationship "distance/diameter Magnus rotor", the diameter of the Magnus rotor and the distance between the rotor blades and the lateral surface of the Magnus rotor.

As has already been mentioned above, for example, the rpm of the Magnus rotor, as well as the direction of rotation can be actuated or adjusted independent of the rpm of the transverse flow rotor.

Moreover, in FIG. 9, deflector plate 56 is schematically indicated, in particular with respect of the dimension or the structural design.

Figure 10:
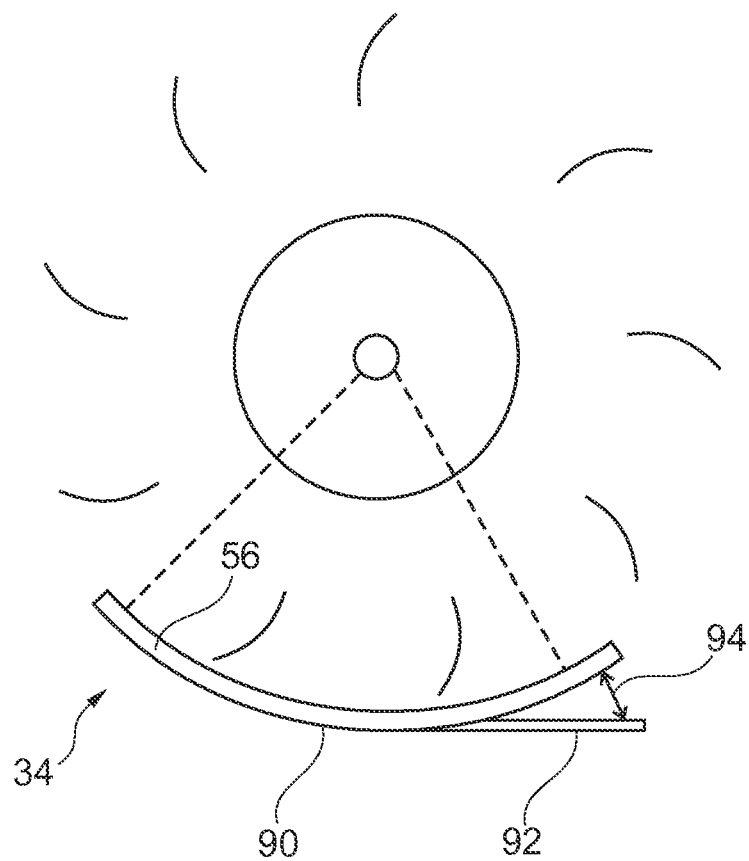
FIG. 10 shows a further embodiment of a hybrid rotor according to the invention.

In FIG. 10, a further exemplary embodiment of the hybrid rotor is shown, in which housing segment 56 of guide mechanism 34 has a side 90 facing away from the transverse flow rotor that has adjustable profile elements 92, using which the cross-section shape can be changed on side 90 that faces away, which is symbolically indicated by a double arrow 94. It should be noted that profile elements 92 are shown only in the section on the right, however, they can also be provided in the left section, i.e., relative to the flight direction—by using the flow lines from FIG. 2—anterior section of guide mechanism 34. The change of the cross-section shape takes place, for example, depending on the rotation setting of the guide mechanism.

Figure 11:
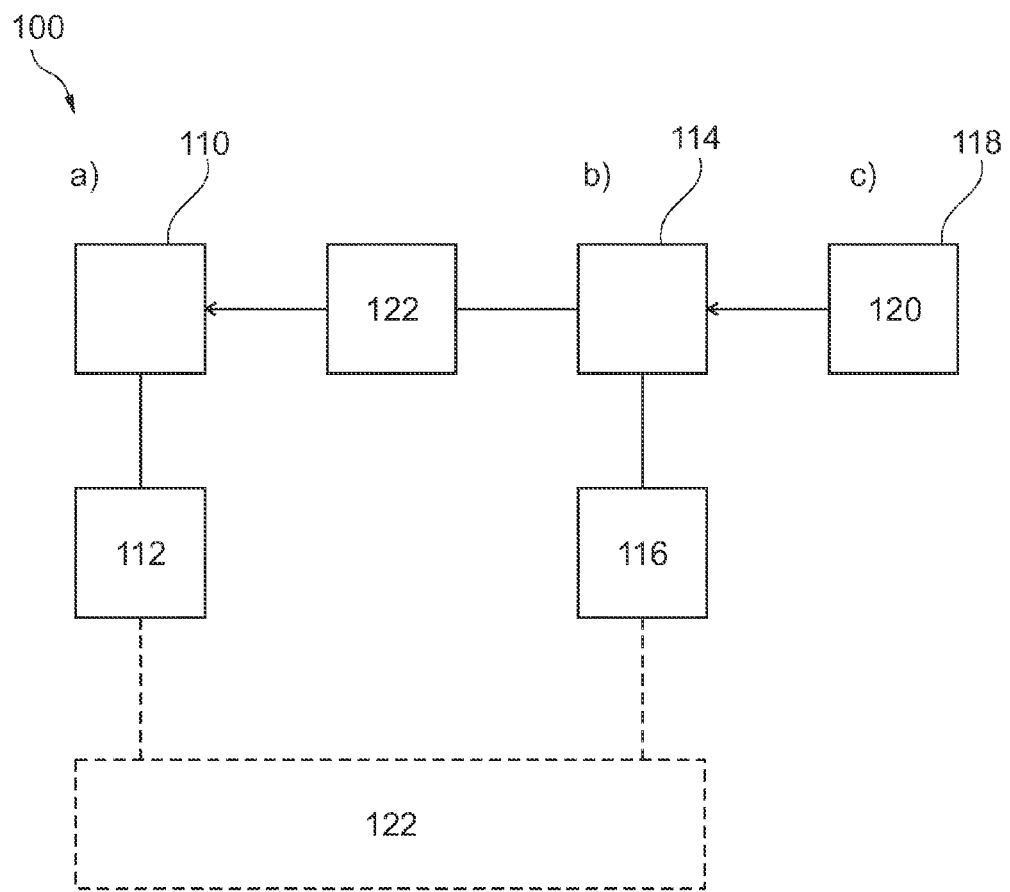
FIG. 11 shows a method for flying an aircraft having a hybrid rotor according to an exemplary embodiment of the invention.

According to the invention, a method 100 for flying the aircraft is also provided, which is shown in FIG. 11, and includes the following steps:

In one step a), a rotating 110 of a Magnus rotor around a Magnus rotor axis is provided, whereby the Magnus rotor, for generating a force 112 according to the Magnus effect, has a closed lateral surface.

In a step b), a rotating 114 of a transverse flow rotor around an axis of rotation is provided that has a number of axially extending rotor blades, which, relative to the tangential angle position, are designed stationary, whereby the rotating of the transverse flow rotor generates a propelling force 116 for the aircraft, which extends transverse to the Magnus rotor axis.

Thereby, the Magnus rotor is located within the transverse flow rotor and the axis or rotation extends in the direction of the Magnus rotor axis.

In a step c) an alignment 118 of a housing segment of a guide mechanism is provided that partially surrounds the transverse flow rotor in circumferential direction, for which a deflection 120 of the housing segment relative to the Magnus rotor axis is provided in such a way that the transverse flow rotor causes a transverse flow 122 onto the Magnus rotor, by means of which force 112 is generated according to the Magnus effect.

According to a further aspect of the invention, the three steps a), b), c) take place simultaneously, or step c) according to need.

According to a further aspect of the invention, as a result the rotating 110 of the Magnus rotor, a lifting force is generated. According to a further aspect of the invention, rotating the Magnus rotor also, or alternatively generates a propulsion force.

Thus, relative to the aircraft, two forces are generated, namely the force according to the Magnus effect 112, and the propulsion force 116.

According to a further exemplary embodiment, which is indicated in FIG. 11 by a dotted line and rectangle, a force 122 is generated, that has a lift vector and a propulsion vector.

According to a further aspect of the invention which is, however, not shown further in FIG. 11, rotating 110 of the Magnus rotor and rotating 114 of the transverse flow rotor, and deflection 120 of the guide mechanism can be regulated separately in such a way that different drive and propulsion forces can be selected or different drive vectors and propulsion vector components.

According to a further aspect, this makes it possible to select different flight directions, whereby it is to be emphasized in particular, that the guide mechanism can be adjusted in such a way that a vertical lift and propulsion force is generated, which makes it possible for the aircraft to take off vertically or have a short takeoff, i.e., start with an extremely short runway.

The exemplary embodiments described above can be combined in different ways. In particular, aspects of the devices for embodiments of the method can also be used, as well as the devices and vice versa.

In addition, it is to be pointed out that "including" does not exclude any other elements or steps and "one" or "a" does not exclude several. Further let it be pointed out that characteristics or steps that have been described referring to one of the above exemplary embodiments, can also be used in combination with other characteristics or steps of other exemplary embodiments described above. Reference numbers in the claims are not to be viewed as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid rotor for an aircraft, comprising:
   a Magnus rotor;
   a transverse flow rotor; and
   a guide mechanism;
   wherein the Magnus rotor is configured to be actuatable to rotate around a Magnus rotor axis by a first propulsion mechanism, and has a closed lateral surface;
   wherein the transverse flow rotor is configured to be kept rotating around an axis of rotation and has a number of axially extending rotor blades that actuatable to rotate around the axis of rotation by a second propulsion device, and which are configured stationary relative to the tangential angle position;
   wherein the Magnus rotor is located within the transverse flow rotor and the Magnus rotor axis extends in the direction of the axis of rotation;
   wherein the guide mechanism has a housing segment partially surrounding the transverse flow rotor in a circumferential direction;
   wherein the housing segment has an adjustment mechanism and is configured deflectable at least relative to the Magnus rotor axis;
   wherein the housing segment is aligned in such a way that the transverse flow rotor generates a propelling force and brings about a transverse flow onto the Magnus rotor in such a way that a force is generated according to a Magnus effect, which acts as lifting force.

2. The hybrid rotor as recited in claim 1, wherein the housing segment has a shape of a circular arc on a side facing the transverse flow rotor.

3. The hybrid rotor as recited in claim 1, wherein the rotor blades respectively have a curved form in cross-section with a concave and a convex side, and wherein the concave side faces the Magnus rotor.

4. The hybrid rotor as recited in claim 1, wherein in cross-section, the rotor blades respectively have an angle ranging from 15° to 70° to a radial direction.

5. The hybrid rotor as recited in claim 1, wherein the Magnus rotor is a cylinder and it respectively has an end plate that extends over the cylinder surface in a section of its ends.

6. The hybrid rotor as recited in claim 5, wherein the cylinder has a number of plates located between the two end plates, and wherein the plates have a larger diameter than the lateral surface.

7. An aircraft, comprising:
    a fuselage area;
    at least one hybrid rotor, which comprises
        a Magnus rotor;
        a transverse flow rotor; and
        a guide mechanism;
        wherein the Magnus rotor is configured to be actuatable to rotate around a Magnus rotor axis by a first propulsion mechanism, and has a closed lateral surface;
        wherein the transverse flow rotor is configured to be kept rotating around an axis of rotation and has a number of axially extending rotor blades that actuatable to rotate around the axis of rotation by a second propulsion device, and which are configured stationary relative to the tangential angle position;
        wherein the Magnus rotor is located within the transverse flow rotor and the Magnus rotor axis extends in the direction of the axis of rotation;
        wherein the guide mechanism has a housing segment partially surrounding the transverse flow rotor in a circumferential direction;
    wherein the housing segment has an adjustment mechanism and is configured deflectable at least relative to the Magnus rotor axis;
        wherein the housing segment is aligned in such a way that the transverse flow rotor generates a propelling force and brings about a transverse flow onto the Magnus rotor in such a way that a force is generated according to a Magnus effect, which acts as lifting force,
    wherein the Magnus rotor and the transverse flow rotor of the at least one hybrid rotor are retained at the fuselage area;
    wherein a first propulsion mechanism is configured to rotate the Magnus rotor of the at least one hybrid rotor and a second propulsion mechanism is configured to rotate the transverse flow rotor of the at least one hybrid rotor;
    wherein the Magnus rotor axis is located horizontal to the flight direction.

8. The aircraft as recited in claim 7, wherein the aircraft has a longitudinal axis and on both sides of the longitudinal axis it respectively has at least one of the hybrid rotors.

9. The aircraft as recited in claim 7, wherein at least two hybrid rotors are provided at a distance in longitudinal direction.

10. A method for flying an aircraft, comprising:
    a) rotating a Magnus rotor around a Magnus rotor axis, wherein the Magnus rotor axis has a closed lateral surface for generating a force according to a Magnus effect;
    b) rotating a transverse flow rotor around an axis of rotation that has a number of axially extending rotor blades that are configured stationary relative to the tangential angle position, wherein the rotating of the transverse flow rotor generates a propelling force for the aircraft that extends horizontal to the Magnus rotor axis, and wherein the Magnus rotor is located within the transverse flow rotor and the axis of rotation extends in the direction of the Magnus rotor axis; and
    c) aligning a housing segment of a guide mechanism partially surrounding the transverse flow rotor in a circumferential direction by a deviating the housing segment relative to the Magnus rotor axis in such a way that the transverse flow rotor brings about a transverse flow onto the Magnus rotor by which the force according to the Magnus effect is generated.

11. A method according to claim 10, wherein the rotating of the Magnus rotor and the rotating of the transverse flow rotor and the deviation of the guide mechanism are controllable separately in such a way that different drive and propelling forces can be selected.

* * * * *